(12) United States Patent
Zhou et al.

(10) Patent No.: US 11,544,887 B2
(45) Date of Patent: Jan. 3, 2023

(54) METHOD FOR GENERATING FACIAL ANIMATION FROM SINGLE IMAGE

(71) Applicants: ZHEJIANG UNIVERSITY, Hangzhou (CN); FACEUNITY TECHNOLOGY CO., LTD., Hangzhou (CN)

(72) Inventors: Kun Zhou, Hangzhou (CN); Jiahao Geng, Hangzhou (CN)

(73) Assignees: ZHEJIANG UNIVERSITY, Hangzhou (CN); FACEUNITY TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/214,931

(22) Filed: Mar. 29, 2021

(65) Prior Publication Data
US 2021/0217219 A1 Jul. 15, 2021

Related U.S. Application Data

(63) Continuation of application No. PCT/CN2018/108523, filed on Sep. 29, 2018.

(51) Int. Cl.
| | |
|---|---|
| *G06T 13/40* | (2011.01) |
| *G06T 13/80* | (2011.01) |
| *G06T 15/04* | (2011.01) |
| *G06T 7/73* | (2017.01) |
| *G06K 9/00* | (2022.01) |

(Continued)

(52) U.S. Cl.
CPC .......... *G06T 13/40* (2013.01); *G06K 9/6265* (2013.01); *G06T 7/75* (2017.01); *G06T 13/80* (2013.01); *G06T 15/04* (2013.01); *G06V 20/597* (2022.01); *G06V 40/176* (2022.01); *G06T 2207/20084* (2013.01); *G06T 2207/30268* (2013.01)

(58) Field of Classification Search
None
See application file for complete search history.

(56) References Cited

U.S. PATENT DOCUMENTS

| | | | |
|---|---|---|---|
| 10,896,535 B2* | 1/2021 | Li | G06N 3/088 |
| 2016/0275341 A1* | 9/2016 | Li | G06V 10/44 |

(Continued)

FOREIGN PATENT DOCUMENTS

| | | |
|---|---|---|
| CN | 101404091 A | 4/2009 |
| CN | 107657664 A | 2/2018 |

(Continued)

OTHER PUBLICATIONS

European Search Report (18935888.0); dated Nov. 12, 2021.

(Continued)

*Primary Examiner* — Tize Ma
(74) *Attorney, Agent, or Firm* — W&G Law Group

(57) ABSTRACT

A method for generating a facial animation from a single image is provided. The method is mainly divided into four steps: generation of facial feature points in an image, global two-dimensional deformation of the image, optimization of details of a facial area, and generation of texture of an oral cavity area. The present disclosure can generate a facial animation in real time according to a change of the facial feature points, and the animation quality reaches a level of current state-of-art facial image animation technology. The present disclosure can be used in a series of applications, such as facial image editing, portrait animation generation based on a single image, and facial expression editing in videos.

2 Claims, 2 Drawing Sheets

(51) Int. Cl.
  *G06K 9/62* (2022.01)
  *G06V 20/59* (2022.01)
  *G06V 40/16* (2022.01)

(56) References Cited

U.S. PATENT DOCUMENTS

2018/0075581 A1  3/2018  Shi et al.
2019/0164341 A1* 5/2019  Venkataraman ........ G06T 7/149
2020/0051303 A1* 2/2020  Li ........................... G06T 13/40

FOREIGN PATENT DOCUMENTS

CN  107895358 A  4/2018
CN  108288072 A  7/2018
CN  108596024 A  9/2018

OTHER PUBLICATIONS

Displaced dynamic expression regression for real time facial tracking and animation; Date of Mailing: Jul. 27, 2014.
Bringing portraits to life; Date of Mailing: Nov. 20, 2017.
Deep video portraits; Date of Mailing: Jul. 30, 2018.
Geometry-Contrastive Generative Adversarial Network for Facial Expression Synthesis; Date of Mailing: Feb. 6, 2018.
Geometry Guided Adversarial Facial Expression Synthesis; Date of Mailing: Dec. 10, 2017.
Realistic Dynamic Facial Textures from a Single Image Using GANs; Date of Mailing: Oct. 22, 2017.
International Search Report (PCT/CN2018/108523); dated Jun. 12, 2019.

* cited by examiner

METHOD FOR GENERATING FACIAL ANIMATION FROM SINGLE IMAGE

CROSS-REFERENCE TO RELATED APPLICATIONS

This application is a continuation of International Application No. PCT/CN2018/108523, filed on Sep. 29, 2018, the disclosure of which is hereby incorporated by reference in its entirety.

TECHNICAL FIELD

The present disclosure relates to the field of facial animation and, in particular, to a method for editing a facial area of a portrait image.

BACKGROUND

The field of facial editing started with the work of Blanz and Vetter (Volker Blanz and Thomas Vetter. 1999. A morphable model for the synthesis of 3D faces. In Proceedings of the 26th annual conference on Computer graphics and interactive techniques. ACM Press/Addison-Wesley Publishing Co., 187-194.), using a single image to obtain, through fitting parameters, a three-dimensional deformable model and texture corresponding to the image. This technology lays foundation for subsequent facial editing work to generate more realistic results (Pia Breuer, Kwang-In Kim, Wolf Kienzle, Bernhard Scholkopf, and Volker Blanz. 2008. Automatic 3D face reconstruction from single images or video. In Automatic Face & Gesture Recognition, 2008. FG'08. 8th IEEE International Conference on. IEEE, 1-8.) (Marcel Piotraschke and Volker Blanz. 2016. Automated 3d face reconstruction from multiple images using quality measures. In Proceedings of the IEEE Conference on Computer Vision and Pattern Recognition. 3418-3427.). These technologies usually cause an edited face to lose details due to a limited expressive ability of principal components.

Some work is based on a section of target person video or a section of driving person video (Umar Mohammed, Simon J D Prince, and Jan Kautz. 2009. Visiolization: generating novel facial images. ACM Transactions on Graphics (TOG) 28, 3 (2009), 57.) (Pablo Garrido, Levi Valgaerts, Ole Rehmsen, Thorsten Thormahlen, Patrick Perez, and Christian Theobalt. 2014. Automatic face reenactment. In Proceedings of the IEEE Conference on Computer Vision and Pattern Recognition. 4217-4224.), and this kind of method can use facial details in the target person video or the driving person video to alleviate, to a certain extent, the problem of loss of details, but this kind of method also has some shortcomings. For example, Face2face (Justus Thies, Michael Zollh¨ofer, Marc Stamminger, Christian Theobalt, and Matthias Nie.ner. 2016. Face2face: Real-time face capture and reenactment of rgb videos. In Computer Vision and Pattern Recognition (CVPR), 2016 IEEE Conference on. IEEE, 2387-2395.) requires that the target person video contains sufficient lip-shape data. Similar to that it is required to use the driving video to enrich the work of generating facial details (Hadar Averbuch-Elor, Daniel Cohen-Or, Johannes Kopf, and Michael F Cohen. 2017. Bringing portraits to life. ACM Transactions on Graphics (TOG) 36, 6 (2017), 196.), quality of generated results decreases as a difference between images of the target person and the driving person increases. In addition, these methods do not have any means to ensure that the generated results conform to real image distribution.

Recently, development of generative adversarial neural networks has provided new ideas for this field, for example, using geometric information as a guide for network training and adopting a method of adversarial training to make the network generated results conform to geometric information and real facial image distribution (Fengchun Qiao, Naiming Yao, Zirui Jiao, Zhihao Li, Hui Chen, and Hongan Wang. 2018. Geometry-Contrastive Generative Adversarial Network for Facial Expression Synthesis. arXiv preprint arXiv: 1802.01822 (2018).) (Lingxiao Song, Zhihe Lu, Ran He, Zhenan Sun, and Tieniu Tan. 2017. Geometry Guided Adversarial Facial Expression Synthesis. arXiv preprint arXiv:1712.03474 (2017).). However, these methods generally can only process cropped facial areas, and non-facial areas cannot be processed, and quality of the generated result decreases as a difference between geometric information of the target and geometric information of an original image increases.

SUMMARY

In view of the shortcomings of the related art, an object of the present disclosure is to provide a method for generating a facial animation from a single image. The present disclosure, through an image global deformation technology, realizes nonlinear geometric changes caused by rigid and non-rigid changes and ensures continuity of the facial area and the non-facial area, then uses a generative adversarial network to optimize texture of the facial area of the deformation image, and finally uses the generative adversarial neural network to fill the oral cavity area, in this way, features of the preserved target person are obtained, to conform to positions of the target feature points and ensure the continuity of the facial area and the non-facial area, and to conform to final results of real facial image distribution. This method reaches a level of the most advanced portrait animation generation technology, and it can realize real-time processing and have a high practical value.

The object of the present disclosure is achieved through following technical solutions, a method for generating a facial animation based a single image, including following steps:

(1) generation of facial feature points of the image: calculating feature points of a facial area in the image and feature points of a background area in the image;

(2) global two-dimensional deformation of the image: based on initial feature points obtained in the step 1 and changes of the feature points specified by a user or a program, generating, through global two-dimensional deformation, a deformation image that conforms to constraint of the feature points;

(3) optimization of details of the facial area: optimizing texture of the facial area in the deformation image through generative adversarial neural network, the facial area not comprising an oral cavity area;

(4) generation of texture of the oral cavity area: synthesizing texture of the oral cavity area through a generative adversarial neural network, and generating a final facial animation image.

Further, the step 1 includes following sub-steps:

(1.1) generation of the feature points of the facial area detecting two-dimensional feature points of the face of the initial image of a target person, an identity coefficient of the person, an expression coefficient and a rigid transformation coefficient; by transmitting an expression coefficient and a rigid transformation coefficient of the driving person, generating a corresponding three-dimensional hybrid deformation model, and projecting it onto a two-dimensional plane, to obtain offset facial feature points;

(1.2) generation of the feature points of the background area:

detecting and tracking feature points of a non-facial area in a driving video, and transforming the feature points of the non-facial area into a target image by a following formula:

$$p_i^t = \varphi \cdot p_i^s,$$

where s denotes the driving person, t denotes the target person, $p_i^t$ denotes the feature point of the non-facial area after the target person is offset, $p_i^s$ denotes a feature point corresponding to a current i-th frame of the driving person, and $\varphi$ denotes a rigid transformation matrix between the initial facial feature points of the target person and initial facial feature points of the driving person, and through the above formula, the feature points of the non-facial area of the target image is obtained.

Further, the step 2 includes: calculating an offset value of each of the feature points based on the feature points of the target person after the offset and the initial feature points; triangulating while taking the feature points of the facial area and the feature points of the background area as vertices; and interpolating offset values of the vertices in each triangle to obtain an offset map; filtering the non-facial area in the offset map with Gaussian kernel, in order to eliminate a problem of discontinuity of the offset values in the non-facial area, a radius of the Gaussian core being in a range of [7, 32] and increasing as a distance from the facial area increases; and finally, through the offset map, transferring pixels in corresponding positions in an original image to positions in a current image, to obtain the deformation image.

Further, the step 3 includes following sub-steps:

(3.1) generating and training and learning the generator and the discriminator of the generative adversarial neural network (simplified as wg-GAN) based on deformation-guiding:

(3.2) cutting and aligning the facial areas of the deformation image and the initial image, generating an offset map according to the feature point offset (normalized) of the two, and taking the facial area of the deformation image and the offset map as input of the optimizer in wg-GAN, to obtain an optimized facial image without the oral cavity area.

Further, the step 4 includes following sub-steps:

(4.1) generating and training and learning the generator and the discriminator of the generative adversarial neural network (simplified as hrh-GAN) suitable for the synthesis of the texture of the oral cavity interior;

(4.2) generating, according to the feature points, the oral cavity area mask map corresponding to the facial image obtained in the step 3.2, and taking the facial image with the mask map as the input of the generator in hrh-GAN, so as to obtain a complete facial image after filling the oral cavity texture.

Beneficial effect of the present disclosure is that, for the first time, the present disclosure proposes a method of generating a facial animation from a single image that combines the global deformation and the generative adversarial neural network, takes advantages of the global deformation to realize the geometric feature changes brought about by the rigid and non-rigid changes and to ensure continuity of a boundary between the facial and the non-facial areas, and takes advantages of the two generative adversarial neural networks obtained by training and learning, to optimize the facial area texture and generate the oral cavity area texture, to make the generated face conform to the real facial image distribution. This method reaches the current level of the most advanced facial image animation generation technology and can process in real time. The present disclosure can be used for editing of facial images, the generation of portrait animation based on a single image, and editing of facial expressions in videos.

DESCRIPTION OF EMBODIMENTS

A core technology of the present disclosure is to use a global deformation technology to process geometric feature changes caused by rigid and non-rigid changes, and use wg-GAN to optimize details of a facial area (excluding an oral cavity), and use hrh-GAN to fill details of an oral cavity area. The method is mainly divided into following four main steps: generation of feature points of a portrait, global two-dimensional deformation of an image according to changes of the feature points, optimization of details of the facial area (excluding the oral cavity area), and generation of textures of the oral cavity area.

Figure 1:
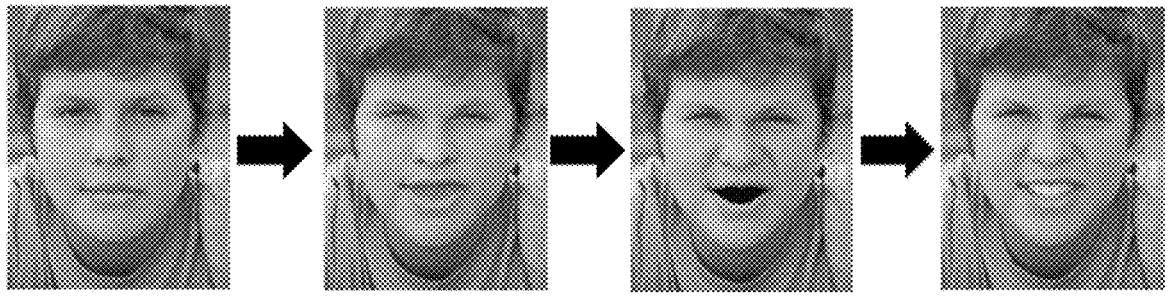
FIG. 1 is a diagram showing generated results of various phases of editing a portrait image of a first target person using a method of the present disclosure.
Figure 2:
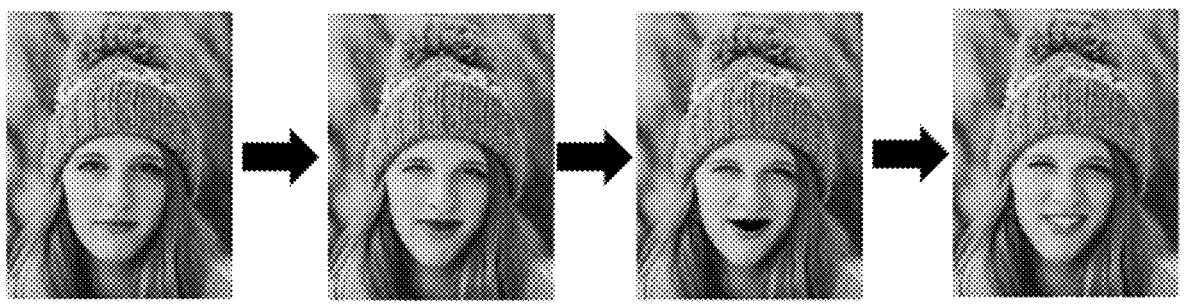
FIG. 2 is a diagram showing generated results of various phases of editing a portrait image of a second target person using a method of the present disclosure.
Figure 3:
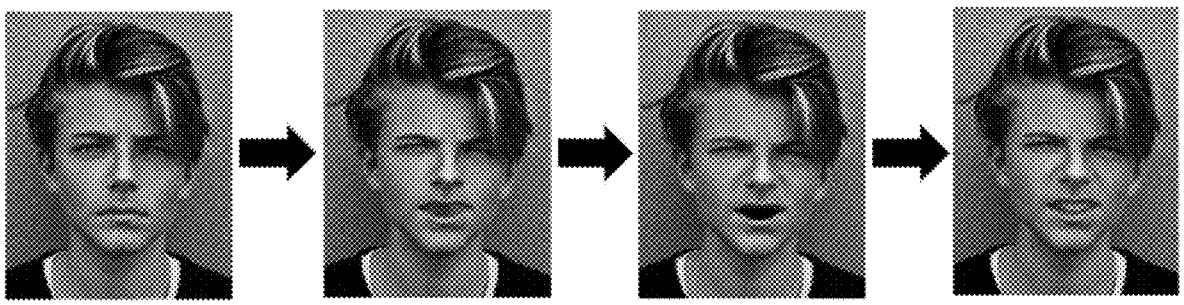
FIG. 3 is a diagram showing generated results of various phases of editing a portrait image of a third target person using a method of the present disclosure.
Figure 4:
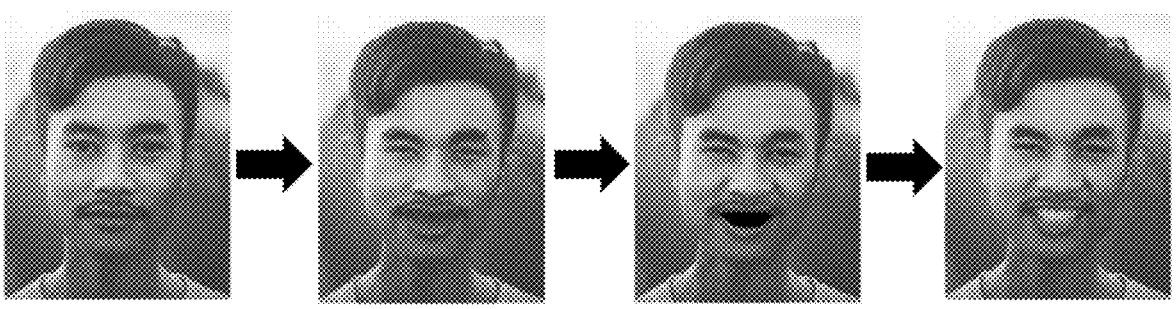
FIG. 4 is a diagram showing generated results of various phases of editing a portrait image of a fourth target person using a method of the present disclosure.
Figure 5:
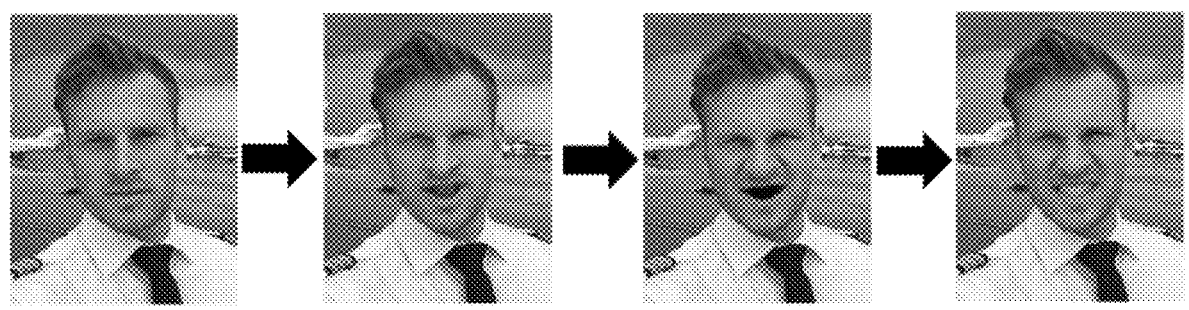
FIG. 5 is a diagram showing generated results of various phases of editing a portrait image of a fifth target person using a method of the present disclosure.

Hereinafter, various steps of the present disclosure will be described in detail with reference to FIGS. 1-5. FIGS. 1-5 show generated results of various phases of editing portrait images of five target persons using the method of the present disclosure. After an input image passes a first arrow, a global deformation result is obtained, then a diagram of a result after optimizing the facial details (excluding the oral cavity) is obtained by going through a second arrow, and then a final generated result after filling the oral cavity area is obtained by going through the last arrow.

1. Generation of Feature Points of a Portrait: Using a Feature Point Detection Algorithm, to Obtain Feature Points of Facial and Background Areas in an Image.

1.1. The Generation of the Feature Points in the Facial Area

The present disclosure refers to an algorithm (Chen Cao, Qiming Hou, and Kun Zhou. 2014a. Displaced dynamic expression regression for real-time facial tracking and animation. ACM Transactions on graphics (TOG) 33, 4 (2014), 43.) to detect two-dimensional feature points of the face of the initial image of the target person, an identity coefficient of the person, an expression coefficient and a rigid transformation coefficient. By transmitting the expression coefficient of the driving person and the rigid transformation coefficient, a corresponding three-dimensional hybrid deformation model can be generated, and it is projected onto a two-dimensional plane, so that offset facial feature points can be obtained.

1.2 The Generation of the Feature Points of the Background Area the method for generating the feature points in the non-facial area in the present disclosure refers an algorithm of (Hadar Averbuch-Elor, Daniel Cohen-Or, Johannes Kopf, and Michael F Cohen. 2017. Bringing portraits to life. ACM Transactions on Graphics (TOG) 36, 6 (2017), 196.). Since there is no robust correspondence between the image of the driving person and the image of the target person in the non-background area, this method detects and tracks the feature points of the non-facial area in the driving video, and transforms them into the target image by a following formula:

$$p_i^t = \varphi \cdot p_i^s,$$

where, s represents the driving person, t represents the target person, $p_i^t$ is the feature point of the non-facial area after the target person is offset, $p_i^s$ is the feature point corresponding to a current i-th frame of the driving person, and φ is a rigid transformation matrix between initial facial feature points of the target person and initial facial feature points of the driving person. Through the above formula, the feature points of the non-facial area of the target image can be obtained.

2. Global Two-Dimensional Deformation of the Image: Based on the Initial Feature Points, According to Changes of the Feature Points Specified by a User or a Program, Generating, Through the Global Two-Dimensional Deformation, a Deformation Image that Conforms to Constraint of the Feature Points.

2.1 Deformation

Calculating to obtain an offset value of each of the feature points according to the feature points of the target person after the offset and the initial feature points. Taking the feature points (the feature points in the non-facial area and the feature points in the facial area) as vertices, triangulating, and interpolating offset values of the vertices in each triangle to obtain an offset map. In addition, in order to eliminate a problem of discontinuity of the offset values in the non-facial area, the non-facial area in the offset map is filtered by Gaussian kernel, a radius of the Gaussian core increases with a distance from the facial area increasing, Gaussian kernels with 5 radii are adopted, whose range is in [7, 32]. Finally, through the above offset map, pixels in corresponding position in the original image is transferred to a current image position, in this way, the deformation image is obtained, and an effect can be referred to a result pointed by the first arrow in FIGS. 1 to 5.

3. Optimization of the Details of the Facial Area (Excluding the Oral Cavity Area): Optimizing the Texture of the Facial Area in the Deformation Image (Excluding the Oral Cavity Area) Through wg-GAN.

3.1 Training wg-GAN

Training data. Taking a public data set MMI (Maja Pantic, Michel Valstar, Ron Rademaker, and Ludo Maat. 2005. Web-based database for facial expression analysis. In Multimedia and Expo, 2005. ICME 2005. IEEE International Conference on. IEEE, 5—pp.), MUG (Niki Aifanti, Christos Papachristou, and Anastasios Delopoulos. 2010. The MUG facial expression database. In Image analysis for multimedia interactive services (WIAMIS), 2010 11th international workshop on. IEEE, 1-4.), CFD (Debbie S Ma, Joshua Correll, and Bernd Wittenbrink. 2015. The Chicago face database: A free stimulus set of faces and norming data. Behavior research methods 47, 4 (2015), 1122-1135.) as a data source. Taking a video as a unit, sampling each section of video at an interval of 10 frame to obtain an image $I_i$, and detecting facial feature points thereof to obtain $P_i$. Selecting a neutral expression image I* in $\{I_i|0<i<N\}$, and obtaining a corresponding feature point P* thereof, and N is a natural number. Using P* and $P_i$ to calculate and obtain a feature point offset $D_i$, and by triangulating $P_i$ and interpolating $D_i$ to deform I*, to obtain a deformation image $W_i$ corresponding to $I_i$. In addition, standard deviation of feature point offset of each part of the face is counted on all training data, and the above standard deviation is used to normalize $D_i$ by part, to obtain normalized $D^*_i$, to generate an offset map $M_i$ from this, and a set of training data is finally formed with ($W_i$, $M_i$, $I_i$). In addition, flip and crop operations are used for data augmentation.

Network structure. A generator (optimizer) network structure is a codec structure. In order to avoid a network compressing too much information during an encoding process, the input image only down-sampled to a quarter of an original size, that is, to down-sample twice, and the down-sampled feature map is caused to pass through 4 residual modules (Kaiming He, Xiangyu Zhang, Shaoqing Ren, and Jian Sun. 2016. Deep residual learning for image recognition. In Proceedings of the IEEE conference on computer vision and pattern recognition. 770-778.), and finally, the image having the original size is output by scaling convolution (Jon Gauthier. 2014. Conditional generative adversarial nets for convolutional face generation. Class Project for Stanford CS231N: Convolutional Neural Networks for Visual Recognition, Winter semester 2014, 5 (2014), 2.). In addition, the network adds skip transfer in the corresponding down-sampling and up-sampling (Phillip Isola, Jun-Yan Zhu, Tinghui Zhou, and Alexei A Efros. 2017. Image-to-image translation with conditional adversarial networks. Proceedings of the IEEE conference on computer vision and pattern recognition (2017).) to ensure correctness of the image structure, that is, two skip transfers are contained, so that the network structure can be expressed as (C64, K7, S1, LReLU, Skip1)→(C128, K5, S2, LReLU, Skip2)→(C256, K3, S2, LReLU)→4*(RB256, K3, S1, LReLU)→(RC128, K3, R2, LReLU, Skip1)→(RC64, K3, R2, LReLU, Skip2)→(C3, K3, S1, Sigmoid), where C, RB, and RC represent a convolutional layer, a residual module, and a scaled convolutional layer respectively, and the number following that represents a size of a depth output by the layer; K represents a core in the module, and the number following that represents a size of the core; the number following S represents a size of a stride in the convolutional layer or the residual module, and if the layer is down-sampled, then S2, otherwise S1; the number following R indicates a scale ratio of the scaled convolutional layer, that is, it is R2 when up-sampling is required; in addition, Skip means skip transfer, and the number following it indicates a serial number, and the same serial number means that they belong to the same piece of skip transfer; LReLU (Andrew L Maas, Awni Y Hannun, and Andrew Y Ng. 2013. Rectifier nonlinearities improve neural network acoustic models. In Proc. icml, Vol. 30. 3.) and Sigmoid represent an activation function used. A discriminator network structure is an encoding structure, which encodes an input content into a feature vector through the convolutional layer and uses fully connected layer output to measure a value of authenticity of the input content, and its structure can be expressed as (C64, K7, S1, LReLU)→(C128, K5, S2, LReLU)→(C256, K3, S2, LReLU)→(C512, K3, S2, LReLU)→(C512, K3, S2, LReLU)→(C512, K3, S2, LReLU)→(FC1), where FC represents the fully connected layer, the number following that indicates that the output is 1, and the fully connected layer does not have any activation function.

Loss function. A function $R(x_w, M)$ is used to represent the optimizer, where $x_w$ is an input deformation image, and M is the offset map. $D(x, M)$ is used to represent the discriminator, where x is the generated result $R(x_w, M)$ of the optimizer or the real image $x_g$. The loss function of the training network can be defined by a following formula:

$$\min_R \max_D \mathbb{E}_{x_w, M, x_g}[\alpha L(R) + D(x_g, M) - D(R(x_w, M), M],$$

$\min_R$ represents derivation of the parameters in the R optimizer, to minimize a value of the target formula; $\max_D$ represents derivation of parameters in the D discriminator, to maximize the value of the target formula; $\mathbb{E}$ represents expectations for each mini-batch; $L(R)$ is a regular term, which is the L1 loss function between $R(x_w, M)$ and $x_g$, for constraining the optimization result of the optimizer, and a specific form thereof is as follows:

$$L(R) = \mathbb{E}_{x_w, M, x_g} \|R(x_w, M) - x_g\|_1,$$

$\alpha$ is a super parameter used to control specific gravity of $L(R)$, and it is equal to 0.004 in the present disclosure. moreover, a formula:

$$\min_R \max_D \mathbb{E}_{x_w, M, x_g}[D(x_g, M) - D(R(x_w, M), M],$$

it is an adversarial loss function, and a loss function used in WGAN (Martin Arjovsky, Soumith Chintala, and L' eon Bottou. 2017. Wasserstein gan. arXiv preprint arXiv: 1701.07875 (2017).) is adopted here. In the training process, in order to improve the effect of adversarial training, during the training process of the discriminator, reference is made to work (Ashish Shrivastava, Tomas Pfister, Oncel Tuzel, Josh Susskind, Wenda Wang, and Russ Webb. 2017. Learning from simulated and unsupervised images through adversarial training. In The IEEE Conference on Computer Vision and Pattern Recognition (CVPR), Vol. 3. 6.), the generated result of the optimizer of the current iterative is combined with historical results of the optimizer and used as input to the discriminator.

3.2 Optimization of the Details of the Facial Area

According to the feature points of the face, the deformation image and the initial facial image are cropped, to obtain the facial area images of the two respectively, and the facial area images of the two are aligned, to obtain $I_i$ and $I_*$ and their corresponding facial feature points $P_i$ and $P^*$. A difference between $P_i$ and $P^*$ is used, to obtain the feature point offset Di from $I_*$ to $I_i$. In the process of implementing the present disclosure, it is found that no matter in the training process or in an actual operation, if the original $D_i$ is directly used to generate the offset map, offset such as offset of eyebrow feature points will be ignored by the network, since offset ranges of parts such as eyebrows, nose and eyes are much smaller than those of the feature points of an oral cavity, however, these parts often produce obvious texture changes under slight geometric feature changes. Therefore, whether in the training or in the actual operation, it is required to normalize $D_i$ by part, and the normalization operation is as follows: calculating the standard deviation of the offset value by part on the entire training data set, using the above standard deviation to normalize the corresponding parts of $D_i$ to obtain $D^*_i$, and by using the feature points as vertices to perform triangulation and interpolation operations, to cause $D^*_i$ to generate the offset map $M_i$. Stitching $I_i$ and $M_i$ to obtain the network input. After inputting to the network, an optimized facial image can be obtained, and the effect can be referred to the results after the second arrow in FIGS. 1-5.

4 Generation of the Texture of the Oral Cavity: Generating the Texture of the Oral Cavity by hrh-GAN.

4.1 Training hrh-GAN

Training data. The data comes from MMI, MUG, CFD and Internet data. By collecting facial images and detecting the facial feature points, to generate a corresponding oral cavity area mask map through the feature points of the oral cavity. The facial image and the corresponding oral cavity area mask map form the hrh-GAN training data. In addition, similar to training wg-GAN, flip and crop operations are also used for data augmentation.

Training method. In the present disclosure, the hrh-GAN network structure and the training method are based on an algorithm (Satoshi Iizuka, Edgar Simo-Serra, and Hiroshi Ishikawa. 2017. Globally and locally consistent image completion. ACM Transactions on Graphics (TOG) 36, 4 (2017), 107.). In this algorithm, a fully convolutional neural network is used as a generator, for completing the image. In addition, combination of a global discriminator and a local discriminator ensures global and local rationality of the generated image. The present disclosure uses a similar generator to generate the oral cavity area, the global discriminator and the local discriminator help the generator to generate reasonable details of the oral cavity area, and the loss function used is the same as that of the Iizuka. During an experiment, it is found that at low resolution, satisfactory results can be obtained using the above training method, however, on a high-resolution data set, details of a tooth area obtained by direct training are unnatural, thus, a training strategy that gradually increases the resolution is used to train the generative adversarial network (Tero Karras, Timo Aila, Samuli Laine, and Jaakko Lehtinen. 2017. Progressive growing of gans for improved quality, stability, and variation. arXiv preprint arXiv:1710.10196 (2017).), and a ratio of input sizes of the global discriminator and the local discriminator is 8:3. In an initial training phase with a resolution of 128*128, a network structure similar to that of Iizuka at the resolution of 128 is used, however, the first layer network of the generator is changed from (C64, K5, S1) to (C64, K1, S1)→(C64, K3, S1), and the last two layers of the network are changed from (C32, K3, S1)→(C3, K3, S1) is changed to (C3, K1, S1); the first layer of the global discriminator is changed from (C64, K5, S2) to (C32, K1, S1)→(C64, K5, S2); the first layer of the local discriminator is changed in the same way as above, and the last convolutional layer is deleted. In the second phase, the first convolutional layer in the first phase of the generator is changed from (C64, K1, S1) to three convolutional layers (C16, K1, S1)→(C32, K5, S1)→(C64, K3, S2); finally, the output layer (C3, K1, S1) is changed to (DC32, K4, S2)→(C16, K3, S1)→(C3, K1, S1), where DC represents deconvolution, and the number following that represents a size of the output depth; the global discriminator changes the first layer (C32, K1, S1) to (C16, K1, S1)→(C32, K5, S2); the first layer of local discriminator is changed in the same as the global discriminator; in addition, a structure of a middle layer of the network is consistent with that in the first phase, and the parameter values are inherited from the first phase. Through such training, a natural high-resolution texture of the oral cavity area can be obtained, and the results can be referred to the results after the third arrow in FIG. 1 to FIG. 5.

4.2 Generation of the Texture of the Oral Cavity Area

According to the facial feature points, calculating the oral cavity area mask map corresponding to the optimized facial image obtained in 3.2, and stitching the facial image with the oral cavity area mask map as the input of the hrh-GAN generator, so as to obtain the facial image after filling the oral cavity area. Finally, the facial image is aligned with the face position in the deformation image through translation and rotation, and it is combined with the non-facial area in the deformation image, to obtain the final portrait image of the target person.

EMBODIMENTS

An inventor has implemented the embodiment of the present disclosure on a machine equipped with an Intel Core i7-4790 central processing unit and a NVidia GTX1080Ti graphics processing unit (11 GB). The inventor used all the parameter values listed in the specific implementation to obtain all experimental results shown in FIG. 5. The present disclosure can use the person portrait in the Internet to effectively and naturally generate the portrait animation according to the driving person. For a 640*480 image, an entire processing flow takes about 55 milliseconds: detecting and tracking of the feature points takes about 12 milliseconds; the global image deformation takes about 12 milliseconds; the optimization of the texture of the facial area takes about 11 milliseconds; the filling of the details of the oral cavity takes about 9 milliseconds; remaining time is mainly used for data transfer between CPU and GPU; in addition, wg-GAN and hrh-GAN need to be trained for 12 hours and 20 hours respectively, and both of them only need to be trained once and then can be used for any target person image.

What is claimed is:

1. A method for generating a facial animation from a single image, comprising following steps:
   (1) generation of facial feature points of the image: calculating feature points of a facial area in the image and feature points of a background area in the image, which comprises following sub-steps:
      (1.1) generation of the feature points of the facial area: detecting two-dimensional feature points of the face of the initial image of a target person, an identity coefficient of the person, an expression coefficient and a rigid transformation coefficient; by transmitting an expression coefficient and a rigid transformation coefficient of the driving person, generating a corresponding three-dimensional hybrid deformation model, and projecting it onto a two-dimensional plane, to obtain offset facial feature points;
      (1.2) generation of the feature points of the background area:
         detecting and tracking feature points of a non-facial area in a driving video, and transforming the feature points of the non-facial area into a target image by a following formula:

$p_i^t = \varphi \cdot p_i^s$, where s denotes the driving person, t denotes the target person, $p_i^t$ denotes the feature point of the non-facial area after the target person is offset, $p_i^s$ denotes a feature point corresponding to a current i-th frame of the driving person, and $\varphi$ denotes a rigid transformation matrix between the initial facial feature points of the target person and initial facial feature points of the driving person, and through the above formula, the feature points of the non-facial area of the target image is obtained;
   (2) global two-dimensional deformation of the image: based on initial feature points obtained in the step 1 and changes of the feature points specified by a user or a program, generating, through global two-dimensional deformation, a deformation image that conforms to constraint of the feature points, which comprises:
      calculating an offset value of each of the feature points based on the feature points of the target person after the offset and the initial feature points;
      triangulating while taking the feature points of the facial area and the feature points of the background area as vertices; and interpolating offset values of the vertices in each triangle to obtain an offset map;
      filtering the non-facial area in the offset map with Gaussian kernel, in order to eliminate a problem of discontinuity of the offset values in the non-facial area, a radius of the Gaussian core being in a range of [7, 32] and increasing as a distance from the facial area increases; and
      finally, through the offset map, transferring pixels in corresponding positions in an original image to positions in a current image, to obtain the deformation image;
   (3) optimization of details of the facial area: optimizing texture of the facial area in the deformation image through generative adversarial neural network, the facial area not comprising an oral cavity area, which comprises following sub-steps:
      (3.1) training the generative adversarial neural network (wg-GAN) based on deformation-guiding:
         (3.1.1) training data: taking a video as a unit, sampling each section of video at an interval of 10 frames to obtain an image $I_i$, and detecting the facial feature point $P_i$; selecting a neutral expression image I* in $\{I_i | 0 < i < N\}$ to obtain a corresponding feature point P* thereof; calculating a feature point offset $D_i$ using P* and $P_i$, and triangulating $P_i$ and interpolating $D_i$ to deform I*, to obtain a deformation image $W_i$ corresponding to $I_i$; counting standard deviation of feature point offset of each part of a face among all training data; and with the standard deviation, normalizing $D_i$ by part to obtain normalized $D_i^*$; generating an offset map $M_i$ based on the normalized $D_i^*$; forming a set of training data ($W_i$, $M_i$, $I_i$); and performing data augmentation by flip and crop operations;
         (3.1.2) a network structure: the network structure of the adversarial neural network being a codec structure, wherein an input image is down-sampled twice, and a down-sampled feature map is caused to pass through four residual modules, and finally, the image having an original size is output by scaling convolution; a network adds skip transfer in corresponding down-sampling and up-sampling to ensure correctness of an image structure, that is, two skip transfers are contained, so that the network structure is expressed as (C64, K7, S1, LReLU, Skip1)→(C128, K5, S2, LReLU, Skip2)→(C256, K3, S2, LReLU)→ 4*(RB256, K3, S1, LReLU)→(RC128, K3, R2, LReLU, Skip1)→(RC64, K3, R2, LReLU, Skip2)→ (C3, K3, S1, Sigmoid), where C, RB, and RC represent a convolutional layer, a residual module, and a scaled convolutional layer, respectively, and a number following each of C, RB, and RC represents a size of a depth output by the layer; K represents a core in the module, and a number following K represents a size of the core; the number following S represents a step size of the convolutional layer or the residual module, and if the layer is down-sampled, then S2, otherwise S1; a number following R indicates a scale ratio of the scaled convolutional layer, that is, it is R2 when up-sampling is performed; Skip indicates skip transfer, and a number following Skip indicates a serial number, and Skips with a same serial number indicates that the Skips belong to a same piece of skip transfer; discriminator network structure is an encoding structure, which encodes an input content into a feature vector through the convolutional layer and uses fully connected layer output to measure a value of authenticity of the input content, and a structure of the discriminator network structure is expressed as (C64, K7, S1, LReLU)→(C128, K5, S2, LReLU)→(C256, K3, S2, LReLU)→(C512, K3, S2, LReLU)→(C512, K3, S2, LReLU)→(C512, K3, S2, LReLU)→(FC1), where FC represents the fully connected layer, a number following FC indicates that an output is 1, and the fully connected layer does not include an activation function;

(3.1.3) loss function: a function $R(x_w, M)$ represents an optimizer, where $x_w$ is an input deformation image, and M represents the offset map, $D(x, M)$ represents the discriminator, where x indicates a generated result $R(x_w, M)$ of the optimizer or an real image $x_g$, and the loss function of a training network is defined by a following formula:

$$\min_R \max_D \mathbb{E}_{x_w, M, x_g}[\alpha L(R) + D(x_g, M) - D(R(x_w, M), M)],$$

where $\min_R$ represents derivation of parameters in an R optimizer and is configured to minimize a value of a target formula; $\max_D$ represents derivation of parameters in a D discriminator and is configured to maximize the value of the target formula; $\mathbb{E}$ represents expectations for each mini-batch; L(R) is a regular term and is an L1 loss function between $R(x_w, M)$ and $x_g$, and is configured to constrain an optimization result of the optimizer, and a specific form thereof is as follows:

$$L(R) = \mathbb{E}_{x_w, M, x_g} \|R(x_w, M) - x_g\|_1,$$

where α is a super parameter and is used to control specific gravity of L(R), and a formula $$\min_R \max_D \mathbb{E}_{x_w, M, x_g}[D(x_g, M) - D(R(x_w, M), M)]$$

is an adversarial loss function, and in a training process, in order to improve adversarial training effect, the generated result of the optimizer of a current iterative and historical results are taken as input to the discriminator;

(3.2) optimization of the details of the facial area: based on the feature points of the face, cropping the deformation image and the initial facial image to obtain a facial area image of the deformation image and a facial area image of the initial facial image, and aligning the facial area image of the deformation image and the facial area image of the initial facial image to obtain $I_i$ and $I_*$ and their corresponding facial feature points $P_i$ and $P_*$; acquiring a difference between $P_i$ and $P_*$ to obtain the feature point offset Di from $I_*$ to $I_i$; and normalizing the feature point offset $D_i$ by part, wherein the normalization operation is as follows: calculating the standard deviation of the offset value by part among the entire training data set, normalizing the corresponding parts of $D_i$ using the standard deviation to obtain $D_i^*$, and by using the feature points as vertices to perform triangulation and interpolation operations, to cause $D_i^*$ to generate the offset map $M_i$, stitching $I_i$ and $M_i$ to obtain the network input; and obtaining an optimized facial image after inputting to the network;

(4) generation of texture of the oral cavity area: synthesizing texture of the oral cavity area through a generative adversarial neural network, and generating a final facial animation image.

2. The method for generating the facial animation from a single image according to claim 1, wherein the step 4 comprises following sub-steps:

(4.1) training a generative adversarial neural network (hrh-GAN) suitable for the synthesis of the texture of the oral cavity interior:

(4.1.1) training data: collecting facial images, detecting the facial feature points, and generating a corresponding oral cavity area mask map through the feature points of the oral cavity, wherein the facial image and the corresponding oral cavity area mask map form the hrh-GAN training data, and the flip and crop operations are also used for data augmentation;

(4.1.2) training method: generating the oral cavity area while taking a fully convolutional neural network as a generator, and generating reasonable details of the oral cavity area through a global discriminator and a local discriminator, wherein a ratio of an input size of the global discriminator to an input size of the local discriminator is 8:3;

(4.2) generation of the texture of the oral cavity area: based on the facial feature points, calculating the oral cavity area mask map corresponding to the optimized facial image obtained in sub-step 3.2; stitching the facial image with the oral cavity area mask map as an input of the hrh-GAN generator, so as to obtain the facial image after filling the oral cavity area; and translating and rotating the facial image, aligning the facial image with the face position in the deformation image, and combining the aligned facial image with the non-facial area in the deformation image, to obtain a final portrait image of the target person.

* * * * *